United States Patent [19]

Shigematsu et al.

[11] Patent Number: 5,689,160
[45] Date of Patent: Nov. 18, 1997

[54] VEHICLE WINDOW LIFT CONTROL

[75] Inventors: Kouichi Shigematsu; Osamu Kawanobe, both of Yokohama, Japan

[73] Assignee: Ohi Seisakusho Co., Ltd., Yokohama, Japan

[21] Appl. No.: 395,983

[22] Filed: Feb. 28, 1995

[30] Foreign Application Priority Data

Feb. 28, 1994 [JP] Japan .................................. 6-30690
Feb. 28, 1994 [JP] Japan .................................. 6-30691

[51] Int. Cl.$^6$ .................................................. H02P 7/00
[52] U.S. Cl. .................................................. 318/281; 49/28
[58] Field of Search .................................. 318/280–286, 318/466–470; 49/26, 28, 138; 160/291, 292, 293.1

[56] References Cited

U.S. PATENT DOCUMENTS

| 3,733,532 | 5/1973 | Hill | 318/286 |
| 4,191,915 | 3/1980 | Johansson | 318/466 X |
| 4,383,206 | 5/1983 | Matsuoka et al. | 49/28 X |
| 4,562,387 | 12/1985 | Lehnhoff | 318/285 |
| 4,686,598 | 8/1987 | Herr | 49/28 X |
| 4,922,168 | 5/1990 | Waggamon et al. | 318/286 |
| 5,404,673 | 4/1995 | Takeda et al. | 49/28 |
| 5,436,539 | 7/1995 | Wrenbeck et al. | 318/467 X |

FOREIGN PATENT DOCUMENTS

| 41 27 047 | 2/1993 | Germany. |
| 43 21 264 | 1/1994 | Germany. |
| 2 013 428 | 8/1979 | United Kingdom. |
| 1 604 266 | 12/1981 | United Kingdom. |
| 2 267 161 | 11/1993 | United Kingdom. |
| 2 268 287 | 1/1994 | United Kingdom. |

*Primary Examiner*—Jonathan Wysocki
*Attorney, Agent, or Firm*—Foley & Lardner

[57] ABSTRACT

A drive control device for an opening/closing member may be advantageously utilized in vehicular power window systems and the like. The drive control device is active to detect occurrence of pinching of an object obstructing the path of motion of the opening/closing member and, upon detection of such pinching during closing operation is controlled so as to move in the opening direction for a predetermined distance for preventing serious pinching from being applied to, for example, a persons hand or arm which may be blocking a power window while being closed by a vehicle driver. The drive control device further includes timing functions such that closing operation may not be immediately resumed after pinch detection, until a predetermined time period has elapsed. The pinch detection operation is effective to compensate for overrun of the opening/closing member caused by a lag between the time a closing control signal is stopped and the acutal motion of the opening/closing member finally and completely stops.

5 Claims, 9 Drawing Sheets

VEHICLE WINDOW LIFT CONTROL

BACKGROUND OF THE INVENTION

1. Field of The Invention

The present invention relates generally to a drive control device for an opening/closing member. Particularly, the invention relates to a drive control device for a opening/closing member incorporating a safety mechanism by which the presence of a foreign object obstructing the closing path of the controlled member is recognized such that closing operation may be modified so as not to pinch or damage the obstructing object.

2. Description of The Related Art

There are known various types of drive control devices in which an electric motor is driven in a first direction for effecting opening operation of the member and in a second, reversed, direction for effecting closing of the member. Such devices may be utilized, for example, in automotive power window installations and the like. According to such an installation, an electric motor is driven in forward and reverse directions for opening and closing a vehicular window (i.e. the opening/closing member).

As a safety precaution, automotive power window systems have been introduced in which the drive control device is equipped with a feature for deducing the presence of an obstruction along the closing path of the opening/closing member (window).

Specifically, this type of 'pinch detection' feature provides means for monitoring fluctuation of the electrical driving current of the motor. If an obstructing member is blocking the path of motion of the power window, causing resisitance to sliding movement thereof, the driving current detected by the monitoring means becomes higher. Then, if the detected driving current exceeds a predetermined threshold a motor which controls movement of the power window is turned OFF.

However, in control operations such as described above, due to factors such as the inherent mechanical and inertial characteristics of the moving parts of the power window installation, even if power to the motor is instantly cut off in response to detection of excessive current, a certain amount of 'overrun' occurs which will move the window slightly further in the driven direction before the window finally comes to a full stop. Consequently, according to operation of such conventional drive control devices, occurrence of such mechanical 'overrun' continues to move the window further in the driven direction even after the time at which the motor was switched OFF in response to detection of pinching (i.e. detection of elecrical current in excess of the threshold). Thus, by the time the window stops completely, its position is such that substantial pinching pressure is applied to the obstructing member.

Generally, a vehicle operator would not anticipate the presence of an obstruction during such routine activity as power window control. Further to this, situations may arise such as when the window being controlled is not within the operator's line of sight, or when no conspicuous noise or sound is produced when the window encounters the obstructing member. Thus, it is possible that the operator may remain unaware that the path of motion of the window is blocked. In such a case it may occur that, out of reflex or habit, the operator may manually switch the power window motor ON again immediately after the motor has been turned OFF, unaware that a pinch detection operation has taken place. Thus the motor will urge the window up still further before the pinch detection system becomes enable to once again disconnect the motor. In such a situation as this, it is possible that an object blocking the vehicle window may be subjected to substantially strong pinching.

Thus it has been required to provide a driving control device for an opening/closing member which reliably detects obstruction and promptly controls window motion so as to surely avoid inflicting strong pinching force on the obstructing member.

It will further be noted that another drawback of such conventional driving control systems during such pinch detection operation is that, once the motor is turned OFF for stopping movement of the window, the current of the motor cannot be monitored. Thus, during occurrence of overrun, when the window (opening/closing member) is still moving in the driven direction (up/down), occurence of pinching cannot be detected. Further, in a case where the motor is reactivated immediately after disconnection in a situation as set forth above, reliable detection of current cannot be accomplished instantly upon restarting of the motor. Thus current detection must be delayed for a given time period (hereinbelow: mask time) until the motor current stabilizes a short time after activation. Thus, according to conventional arrangements, occurrence of pinching cannot be reliably carried out during mechanical overrun or at the time of restarting of the motor.

In this case it is possible that pinching of an object blocking a power window may occur during overrun after the threshold current is detected and, if immediate restarting of the motor is attempted, further substantially strong pinching is added upon restarting. Such undesirable application of pinching is thus prolonged until the driving current of the restarted motor has again stabilized sufficiently to allow pinch detection operation to be resumed.

SUMMARY OF THE INVENTION

It is therefore a principal object of the present invention to overcome the drawbacks of the related art.

It is a further object of the present invention to provide a drive control with a high degree safety device for an opening/closing member which can assuredly detect occurrence of pinching and prevent restarting operation which may lead to additional pinching.

In order to accomplish the aforementioned and other objects, a drive control device controling a driving mechanism of an opening/closing member is provided, comprising: monitoring means which issues a first detection signal when the opening/closing member is positioned within a predetermined monitoring zone including a position which is near a terminal position of closing movement of the opening/closing member; and pinch prevention control means active to control the opening/closing member to temporarily move in a first opening direction by a predetermined degree before beginning movement in a second closing direction, when the the driving mechanism operates to start closing movement of the opening/closing member while the first detection signal is present.

According to another aspect of the invention, a drive control device controling a driving mechanism of an opening/closing member to drive the opening/closing member in first and second directions is provided, comprising: monitoring means which issues a first detection signal when the opening/closing member is positioned within a predetermined monitoring zone including a position which is near a terminal position of movement of the opening/closing member; and pinch prevention control means active at one of the times, when the driving mechanism operates to initiate movement of the opening/closing member and, when the driving mechanism operates to terminate movement of the opening/closing member in a selected one of the first and second directions, to control the drive mechanism to initially move the opening closing member in a direction opposite the selected direction by a predetermined degree when the first detection signal is present.

BRIEF DESCRIPTION OF THE DRAWINGS

In the drawings:

FIGS. 4(a)–4(g) are time charts for depicting an operational timing of the drive control device;

FIGS. 9(a)–9(g) are time charts depicting an alternative embodiment of operational timing for of the drive control device according to the invention.

DESCRIPTION OF THE PREFERRED EMBODIMENTS

Referring to the accompanying drawings, a first preferred embodiment of the invention will be described hereinbelow in detail. The preferred embodiment is drawn to a drive control device to be utilized for controlling an automotive power window system.

Figure 1:
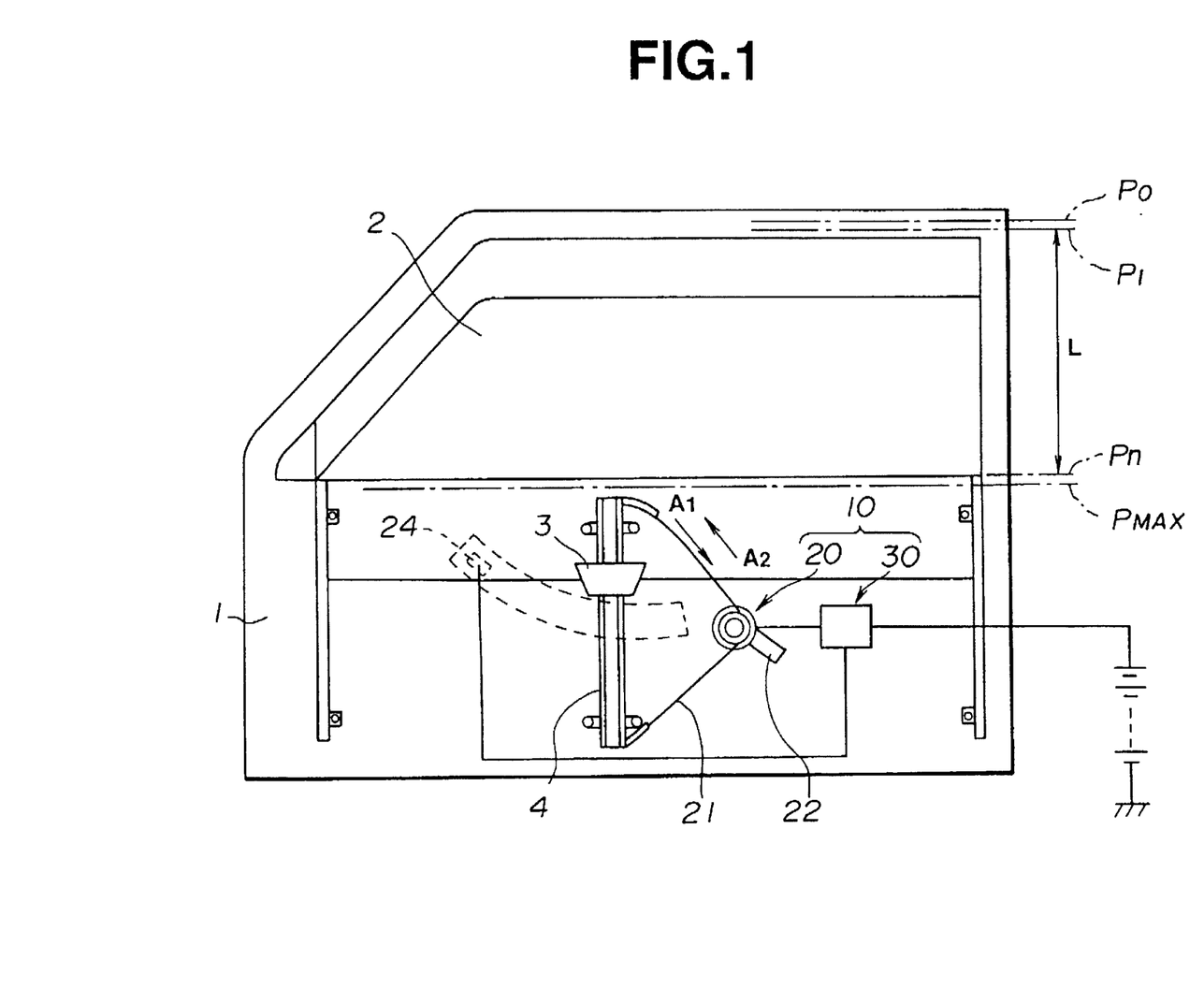
FIG. 1 is a side view of a drive control device according to the invention installed in a vehicle door.

As may be seen in FIG. 1, a drive control device 10 according to the invention is installed in a automotive side door 1 for controlling raising and lowering operations of a sliding window 2. The drive control device 10 includes a drive mechanism 20 which raises and lowers a carrier 3 attached to the window 2 by moving the carrier 3 along a guide rail 4. According to this arrangement, window motion is controlled by movement of a wire 21, by rotation of a driving power source (i.e.; electric motor) 22 of the drive mechanism 20, in first and second directions denoted as A1 and A2 in FIG. 1.

Figure 2:
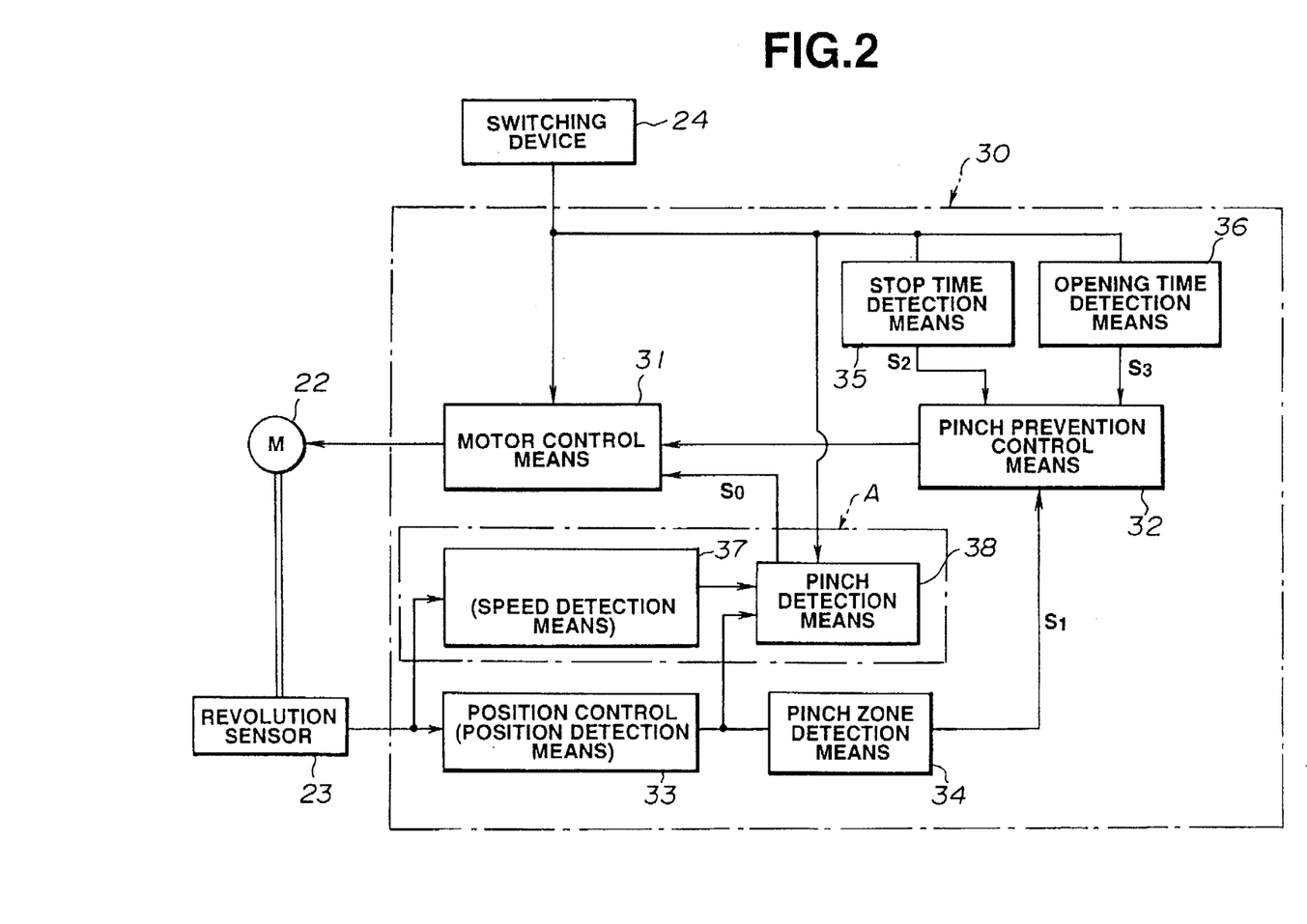
FIG. 2 is a schematic diagram of the components of a control unit of the drive control device of the invention.

As seen in FIG. 2, the motor 22 is equipped with a speed sensor 23 which outputs a pulse signal (see FIG. 4e) in accordance with the rotational speed of the motor 22. Within the structure of the door 1, a switching device 24 is disposed. The motor 22, the speed sensor 23 and the switching device 24 are electrically connected to a control unit 30.

FIG. 2 is a schematic diagram showing the construction of the control unit 30. As may be seen, the control unit includes motor control means 31 which determines an operational mode of the motor 22 in accordance with the operating condition of the switching device 24 and control signals from a pinch prevention means 32 and a pinch detection portion A which will be further described hereinafter.

The switching device 24 is operable in an UP switch mode so as to output an UP signal as shown in FIG. 4a for effecting upward movement of the window 2, and a DOWN switch mode outputting a DOWN signal as shown in FIG. 4b for effecting downward movement of the window 2. That is, when an UP signal is issued, the motor control means 31 actuates an up relay (not shown) to ON to cause the motor 22 is rotate in a first (up) direction. Conversely, when a DOWN signal is issued, the motor control means 31 actuates a down relay (not shown) to ON to cause the motor 22 is rotate in a second (down), or reverse direction. The pinch prevention means 32 is operable to further control the operation of the motor 22 in accordance with input signals S1, S2 and S3 as will be explained in further detail hereinlater.

The control unit 30 further includes a position detection means 33 which is operable to count pulses from the pulse signal output by the speed sensor 23 for determining a current vertical position P of the window 2 according to a counted number of pulses. According to the present embodiment, a counting portion (not shown) of the position detection means 33 is set to zero (0) when the window 2 is in its fully up position P0, while the highest counter value Pmax is reached when the window 2 is fully lowered. Thus, when the window 2 is raised, the position detection means 33 is active to count down from a higher value down as far as 0 indicating that the window 2 has been fully raised.

Referring again to FIG. 2, a pinch zone detection means 34 is provided, the pinch zone detection means 34 determines whether or not the window 2 is positioned in a pinch monitoring zone L which ranges from a first position P1, a given distance from the known position P0, and a position Pn, a given distance from the known position Pmax. That is, when the current position P of the window 2 is within the pinch monitoring zone L a first detection signal S1 is output from the pinch zone detection means 34. The pinch monitoring zone L indicates a window position within which a sufficiently high probability of occurrence of undesirable pinching has been determined.

In addition to the pinch zone detection means 34, a stop time detection means 35 is provided which includes a timer T1 (also refer to FIG. 4g). According to this, when an UP switch relay of the switching device 24 is turned OFF ofter having been ON, the timer T1 begins running. When the OFF condition of the UP switch relay remains OFF for a predetermined stabilizing period, the timer T1 reaches a 'time-up' condition and is deactivated. The duration of the stabilizing period T1 counted by the timer T1 is determined according to a predicted overrun period during which window raising can be expected to continue after switching OFF of the UP relay due to inertia of the mechanical parts, motor, etc. During the running period of the timer T1, a second detection signal S2 is generated and output from the stop time detection means 35.

An open time detection means 36 including a second timer T2 (see also FIG. 4f) is provided which operates such that, after the down relay of the switching device 24 is turned temporarily ON and subsequently becomes OFF (later described in detail), the timer T2 is activated for a second stabilizing period T2, during which a third detection signal S3 is output from the open time detection means 36.

A pinch prevention portion A of the control unit 30 also includes a periodic calculating portion, or a (opening/closing member) speed detection means 37 which, by calculating the output of the speed sensor 23, calculates the closing speed (i.e. rising speed) of the window 2. Then, based on both the closing speed detected at the speed detection means 37 and the counter value P output from the position detection means 33, a pinch detection means 38 may determine whether the window, rising within the pinch monitoring zone L, has pinched a window obstruction. Such determination may be carried out in various ways according to the above-described construction of the preferred embodiments, a selection of examples thereof being described in detail hereinafter.

1) One method of such determination is carried out according an arrangement wherein a reference rising (closing) speed is predetermined for each position P of the window 2. At each position P during raising of the window 2, the reference rising speed and an actual closing speed detected by the speed detection means 37 are compared. According to this, when the detected actual speed becomes less than the reference rising speed by a predetermined degree, a detection signal S0 is issued, indicating occurrence of pinching. As noted above, just after activation of the motor 22 for raising the window 2, the electrical current is unstable, at this time, the motor speed is also unstable. During this time period, which will be herein referred to as 'mask time t0', pinch detection operation does not take place. The time during which the window 2 is rising within the pinch monitoring zone L will be referred to as the 'movement detecting period' while the reference rising speed may be preset in memory, or derived automatically based on the detected actual closing speed of the window 2, via per se known 'learning control' type calculation procedures.

2) A second method of pinch detection according to the invention utilizes a reference rising speed change rate, rather than reference rising speed, for determining occurrence of pinching. According to this method a reference rising speed change rate is predetermined for each position P of the window 2 along the path of motion. According to this, at each position P of the window 2 during closing operation the reference rising speed change rate and an actual closing speed change rate 37 are compared as with the above method. Accordingly, when the detected actual speed change rate becomes less than the reference rising speed change rate by a predetermined degree, a detection signal S0 is issued, indicating occurrence of pinching. Of course, just after activation of the motor 22 for raising the window 2 when electrical current is unstable, the motor speed change rate will also be unstable. During this 'mask time t0' time period, pinch detection is not carried out. The 'movement detecting period' is the time during which the window 2 is rising within the pinch monitoring zone L, while the reference rising speed change rate may be preset in memory, or derived automatically based on the detected actual closing speed change rate of the window 2, via per se known 'learning control' type calculation procedures, as noted in connection with the above first method.

3) Another alternative method for carrying out pinch detection according to the invention may be accomplished by monitoring the electric current flow through the motor 22. According to this, when the current exceeds the predetermined threshold level, the S0 signal is issured. Just after activation of the motor 22 for raising the window 2 when the electrical. current is unstable. During this 'mask time t0' time period, pinch detection may not be carried out. As above, the 'movement detecting period' is the time during which the window 2 is rising within the pinch monitoring zone L. It will be noted that, according to the invention the opening/closing member (window 2) in the presence of one or more of the signals S1, S2, S3 or during the mask time t0 period when pinch prevention is not carried out, the window 2 may be automatically controlled to move in the DOWN direction by a predetermined pinch prevention degree upon initiation, or termination, of UP operation as will be explained further hereinbelow.

In all the above methods, the pinch detection signal S0 is output by the pinch detection means 38. The motor control means 31 is active to disconnect the motor 22 upon receiving the pinch detection signal S0.

Figure 3:
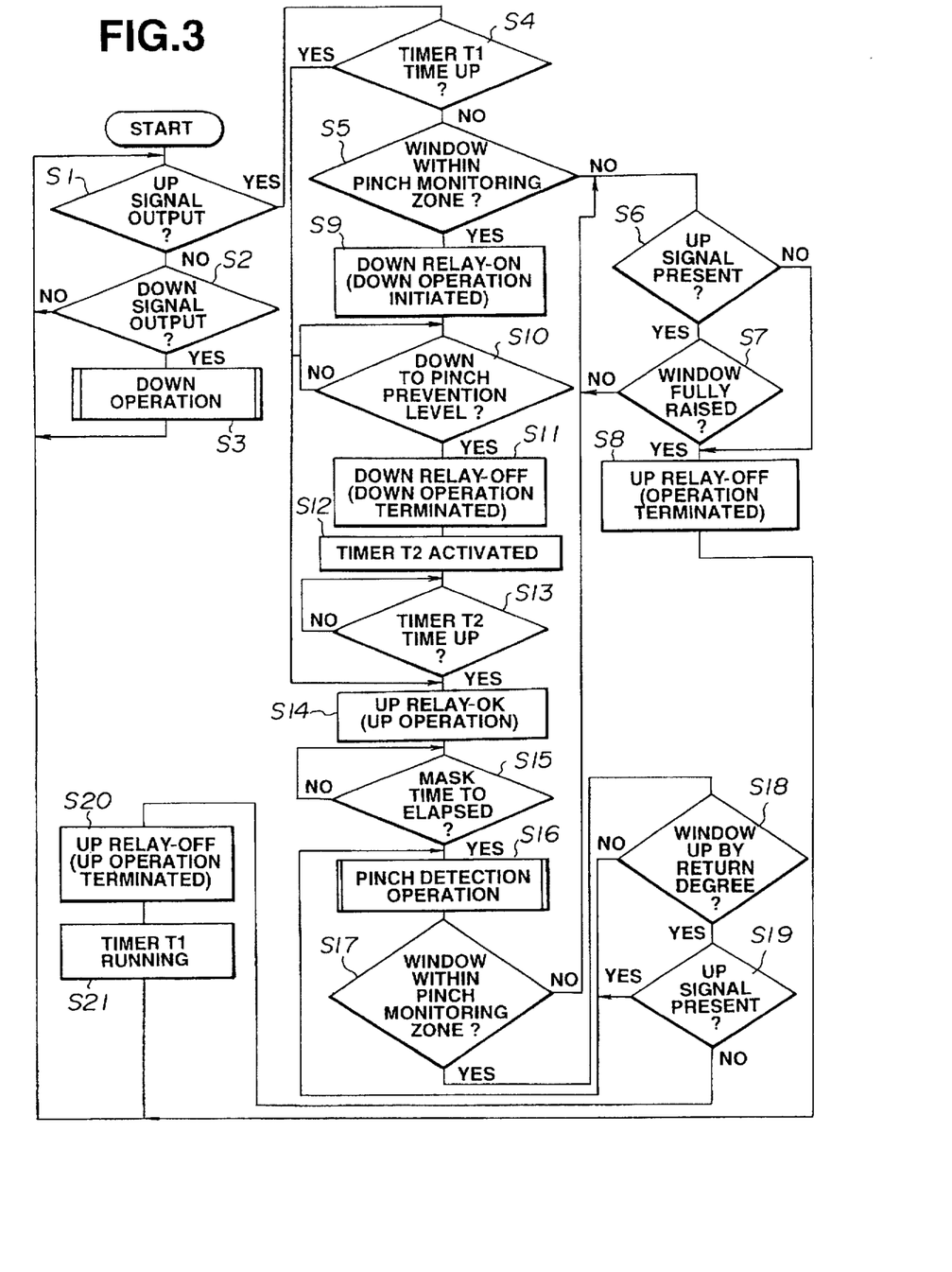
FIG. 3 is a flowchart of a control process of the drive control device.
Figure 4:
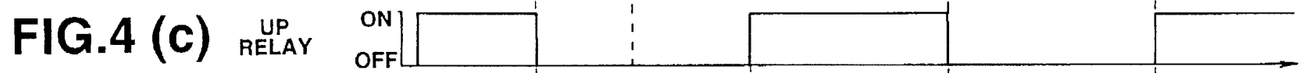

Referring to FIGS. 3 and 4, operation of the drive control device according to the invention upon detection of pinching will be described in detail.

As may be seen in steps S1 and S2 when the switching device 24 is operated window UP or DOWN signals are present at steps S1 or S2 respectively. In operation according to the present embodiment, when a window DOWN signal (see FIG. 4b) is received at step S2, operation proceeds to step S3 and the motor control means 31 activates the motor 22 to rotate for carrying out window lowering operation. However, when a window UP signal (see FIG. 4a) is present in step S1, the program goes to step S4, wherein, if the timer T1 is in a 'time up' or inactive state, the UP relay of the switching device 24 is turned ON and the operation flow proceeds to step S14 and the motor control means 31 activates the motor 22 to rotate for carrying out window raising operation.

When however, the timer T1 is active at step S4 and the stabilizing period has not passed and the window position P is not within the pinch monitoring zone L operation proceeds to step S6 to monitor the window UP signal to determine that the signal is still present or has been discontinued, step S7 where it is checked whether or not the window is fully raised and then to a step S8 where the up relay is switched OFF. That is, the UP relay will be switch OFF if the window UP signal is discontinued or if the window has been fully raised.

It will be noted that the mask time t0 is set to a period longer than a time required for raising the window 2 from the lowermost position Pmax to the position Pn. Accordingly, a situation in which UP operation of the window 2 is engaged and the window 2 is not in the pinch monitoring zone L would only occur when the window 2 is rising from the position P1 to the uppermost position P0. Thus the operation of step S8 would be executed at such time.

When the timer T1 is not in a time up state and the window is within the pinch monitoring zone L, the process goes to a step S9 in which the down relay is temporarily engaged to move the window initially downward. Then at step S10 it is determined whether window DOWN operation has been carried out to lower the window by a predetermined 'pinch prevention' degree, after which the down relay is switched OFF at step S11 to discontinue window DOWN operation. Then, at a step S12 the timer T2 is activated to begin counting the second stabilizing time period T2. At step S13 it is determined whether or not the second stabilizing time period T2 has elapsed, when the answer is YES at step S13 the operation flow may proceed to step S14 at which the up relay is turned ON for carrying out window UP operation.

It will be noted that the duration of the second stabilizing period T2 is determined as being at least equal to a time required for a predicted overrun period during which window lowering can be expected to continue after switching OFF of the DOWN relay, due to inertia of the mechanical parts, motor, etc. According to provision of the second stabilizing time period T2, window UP operation is delayed so as not to follow too closely after the temporary window DOWN operation (steps S9–S11) so that overload current is never applied to the driving mechanism 20, which may cause damage to the power window system, particularly wire 21 (see FIG. 1) thereof.

After rising movement of the window 2 is initiated at step S14, the mask time t0 is counted at step S15. When the period of the mask time t0 has passed, the operation flow may proceed to step S16 wherein pinch detection operation may be resumed. As noted hereinabove, the duration of the mask time t0 is of sufficient length to allow stabilizing of electrical current flow to the motor 22 after which reliable monitoring of the motor current may be carried out, thus allowing accurate pinch detection operation.

Pinch detection operation of step S16 is continued during window UP operation. At step S17 it is again determined whether of not the window is travelling withing the pinch monitoring zone, if the answer is NO at step S17, the operation flow goes to step S6 while if YES the operation flow proceeds to step S18. At step S18 it is determined if the window 2 has been raised by a predetermined return degree set to be equal to the down distance travelled by the window 2 during the temporary window DOWN operation of steps S9–S11 and the down distance travelled by the window during the second stabilizing time period T2 as determined by the position counter 31. When upward window motion during window UP operation is sufficient to regain this predetermined return degree the operation flow proceeds to step S19 where it is monitored whether or not the UP signal is present. If YES at step S19 the operation flow cycles back to step S16 while window UP operation is continued. If NO at step S19, the operation proceeds to step S20 at which the UP relay is switched to OFF and window UP operation is terminated. It will be noted that pinch detection monitoring is continued through steps S17–S19 and if pinch is detected during this time the signal S0 is output, as has been described hereinbefore, and the motor 22 is stopped.

After switching OFF of the UP relay in step S20 the program goes to step S21 whereat the timer T1 begins running to count down the first stabilizing time period T1, after which the routine returns to step S1.

Thus whenever window UP operation is about to begin, the window 2 is first lowered by a predetermined pinch prevention degree which is subject to two conditions; (I) one being the the window 2 is positioned within the pinch monitoring zone L (i.e. the first detection signal S1 is present) and second (II), that the first stabilizing time period T1 has not passed (i.e. that second detection signal S2 is present).

Accordingly, under no conditions will window UP operation be resumed after pinch detection in a manner so as to induce hard pinching of a member obstructing the path of window motion. Thus a high degree of safety is assured.

Further, the above described operational flow may be modified such that the stabilizing time period T1 is not questioned. That is, whenever window UP operation is to start the window 2 will automatically be lowered momentarily by the pinch prevention degree subject only to the condition (I). According to this, the pinch detection step may be omitted and operation is simplified while a high degree of safety is maintained.

Figure 5:
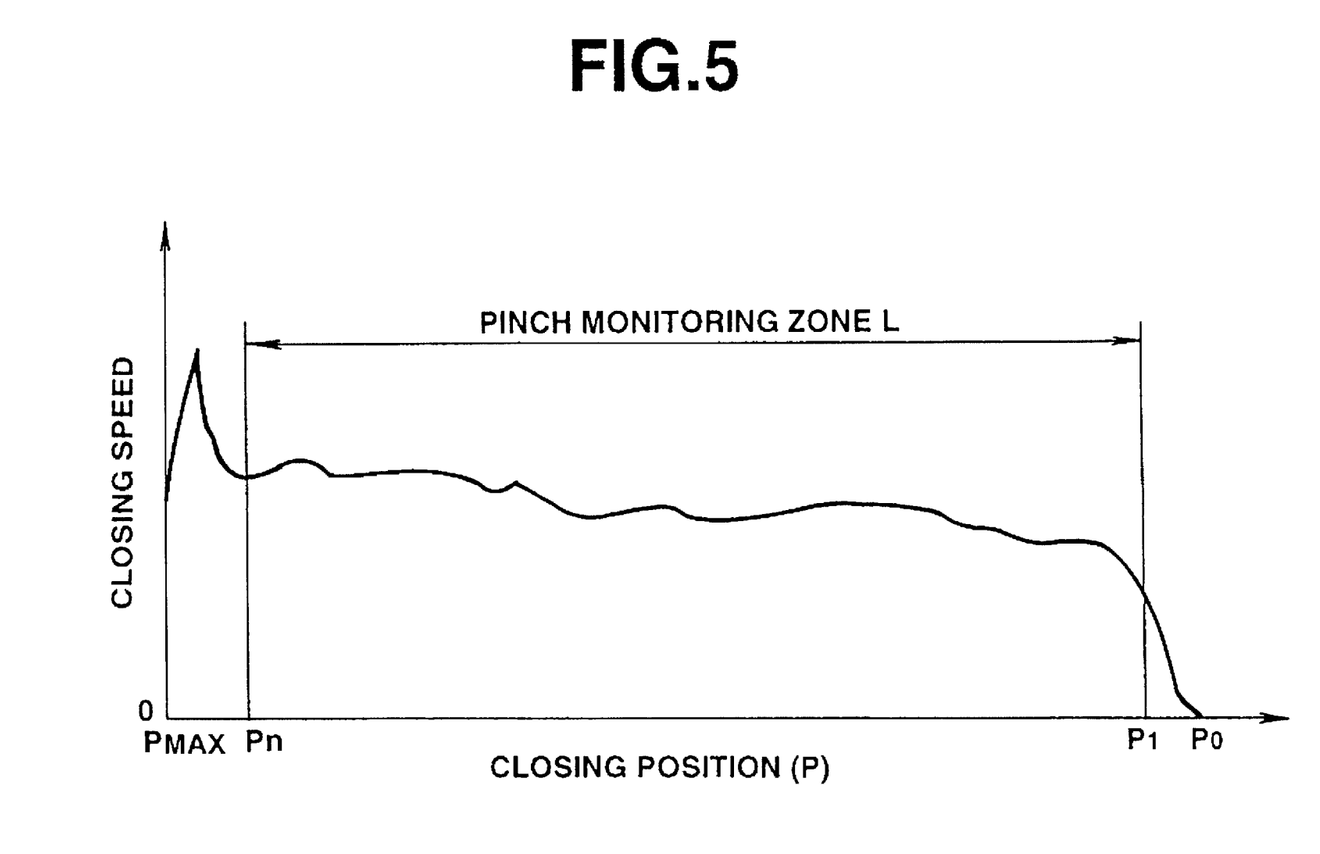
FIG. 5 is a graph showing a relation between a closing position of an opening/closing member and the closing speed of same.

FIG. 5 is a graph showing a relation between the closing position (i.e. a position of the upper window edge) of the window 2 during window UP operation and the closing speed thereof. FIGS. 6(a) and 6(b) respectively show the closing speed of the window 2 and the closing load thereof during pinch prevention operation.

According to such operation, at the time of pinch detection, the motor 22 is switched OFF at a pinch detection position PA while, due to overrun of the motor etc., the window 2 does not come to a complete stop until reaching a second closing position PB. At this time, pinch prevention operation becomes active to return the window 2 back to the pinch detection position PA (see dashed line in FIG. 6(a)). Thus the operator may note that pinching has occurred while the window positioning is established such that the obstruction which caused the pinching may be be easily removed.

In practice, actual occurrence of pinching naturally occurs slightly before detection and prevention processing acts to turn OFF the motor 22 at the pinch detection position PA. Then residual motion (i.e.; motor overrun etc.) carries the window beyond the detection position PA to finally stop window motion completely at the final closing position PB. However, according to the invention, even if the switching device 24 is subsequently operated to resume window UP operation, additional or strong pinching is avoided since the window 2 had already been moved back down to the pinch detection position PA at the previous pinch prevention operation.

Referring now to FIG. 6(b), a condition may arise where the obstruction which had caused the above-described pinching is not removed from the path of window travel. In such case, if the switching device 24 is reactivated to resume window UP operation from the position PA, load gradually increases as the window moves from the position PA toward the position PB. Initially, this gradual increase in load is not detected since load detection is not carried out during the mask time t0. Then, by the end of the mask time t0 the window 2 will have moved past the closing position PB to a second closing position PC. The second closing position PC equals the window position just as the mask time t0 elapses and also corresponds to the moment at which load detection is reactivated. Thus, the increased load is instantly detected and pinch prevention operation is carried out immediately. Thus the window closing motion may be promptly stopped while the closing load is still relatively small. In other words in such a situation as described above, the window may still be reliably stopped before strong pinching may be applied to the obstructing member.

Figure 7A:
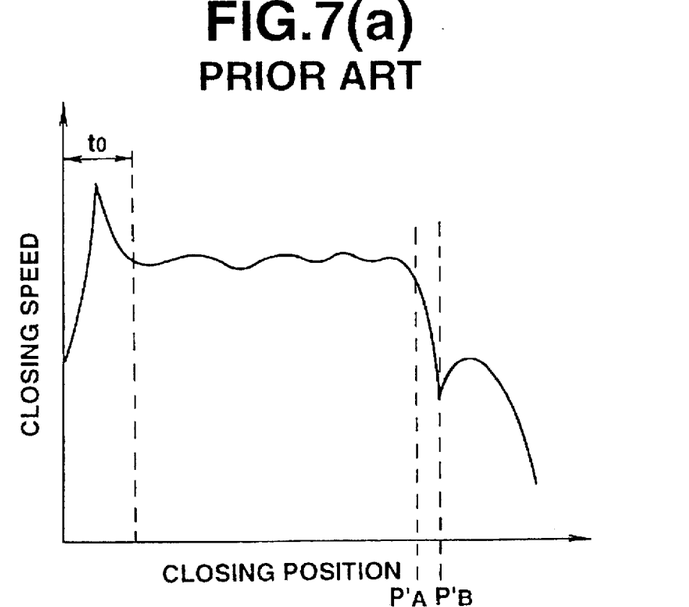
FIG. 7(a) and FIG. 7(b) are operational characteristic graphs showing an example of pinch prevention control executed by a conventional drive control device.
Figure 7B:
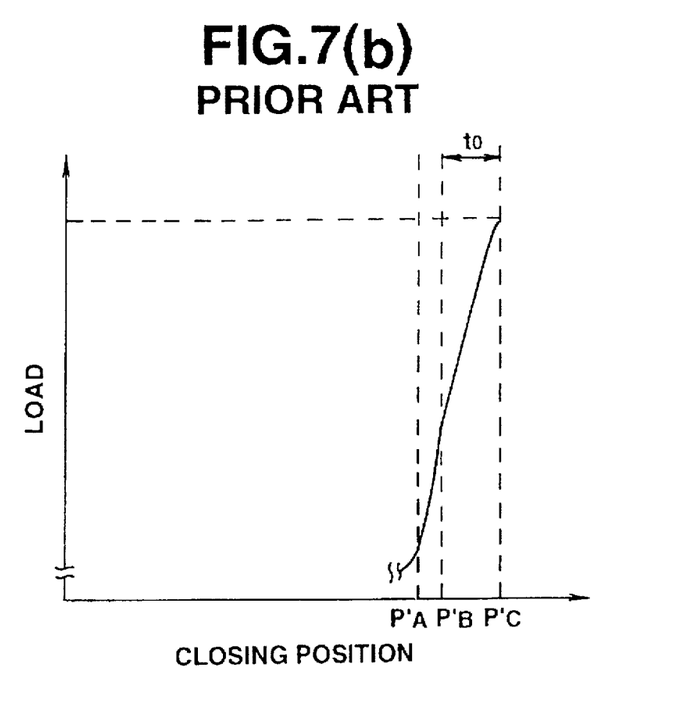

In contrast to the above, FIGS. 7(a), 7(b) are explanatory graphs detailing operation of a drive control device wherein a conventional manner of pinch detection is implemented.

According to operation of such conventional drive control device, just after occurrence of pinching, a detected load becomes higher than a threshold level causing the motor to be turned OFF at a pinch detection position P'A As noted above, the window 2 reaches a first closing position P'B before coming to a complete stop due to overrun of the motor, inertia of mechanical parts, etc. However, since the conventional system does not compensate for such overrun by returning to the detection position, if an operator should activate the switch for resuming window UP operation without noticing that pinching has occurred the window will again begin its upward travel starting from its last stop position P'B. However, as may be seen in FIG. 7(a), since this window UP operation starts from a window postion higher (i.e. lower counter value of P) than the pinch detection postion PA of the invention, by the time the mask time t0 has elapsed, the conventional window has reached a second closing positon P'B which is substantially higher (i.e.

lower counter value of P) than the second closing position PC of the invention.

Thus, in such a conventional case as set forth above, by the time the mask time t0 elapses and load detection operation is resumed, the window has been raised a greater distance than than would occur in operation according to the invention. That is to say, according to the conventional operation of FIG. 7(b), by the time the mask time t0 has elapsed a closing load will be significantly high. According to this, even if the motor is turned OFF at the second closing position PC immediately upon detection of the high load, by the time the window 2 comes to a complete stop, excessively strong pinching force will inevitably be applied to the obstructing member.

Thus, pinch prevention operation according to the first preferred embodiment of the invention as has been described in detail hereinabove, provides a highly safe drive control device which may reliably detect pinching due to the presence of an obstructing member in the path of motion of an automotive power window (i.e. an opening/closing member). Further, the drive control device of the embodiment is active to prevent further, excessively strong pinching force from being accidentally applied to the obstructing member due to oversight or misoperation related to control of the opening/closing member.

It will be noted that, although the above described embodiment of the invention has been set forth in terms of an automotive power window system, the present invention may also be utilized in various other mechanisms in which highly safe operation is desired for control of opening/closing members. Specifically, such control may be applied to valves, shutters, automatic door systems, access hatches and various other manually controlled opening/closing members for which operational safety must be assured in a case where an obstruction is encountered in the path of closing motion of the opening/closing member.

Hereinbelow, a second preferred embodiment of a drive control device for an opening/closing member aaccording to the invention will be described in detail. For brevity, portions of the second embodiment which correspond to identical portions of the above-described first embodiment will be referred to by the same reference numbers. Likewise, the following detailed description of the drive control device of the second embodiment will omit repetition of portions of the disclosure which were previously elaborated in the above description of the first embodiment.

First, it may be appreciated that the structure of the drive control device of the second preferred embodiment is substantially the same as that of the first embodiment. The present embodiment is also drawn to a vehicular power window installation.

Referring again to FIG. 1 there is shown a schematically illustrated side view of an automotive side door 1 which is equipped with the drive control device 10 according to the second embodiment. As in the first embodiment, the drive control device 10 comprises a driving mechanism 20 which raises and lowers a carrier 3, which is fixed to a window 2, along a guide rail 4. In the driving mechanism 20, when a wire 21 is moved in the direction of the arrows A1 or A2 according to rotation of an electric motor 22 in forward or reverse directions, the window 2 is raised or lowered together with the carrier 3. The electric motor 22 is equipped with a speed sensor 23 (see FIG. 2) which outputs a pulse signal (motor pulse, see FIG. 4e) in accordance with the rotation speed of the motor. Inside the side door 1, there is arranged a switch device 24. The electric motor 22, the speed sensor 23 and the switch device 24 are electrically connected to a control device 30.

The components of the drive control device 10 according to the second embodiment is the same as that of the first embodiment which has been described hereinabove in relation to FIG. 2, redundant description thereof shall therefore be omitted for brevity.

As in the first embodiment, a pinch zone detection means 34 which, based on the values counted by the position detection means 33, makes a judgement as to whether or not the window 2 is positioned within a pinch monitoring zone L ranging from a position P1 at a given distance downward from the uppermost position P0 and a position Pn a given distance upward from the lowermost position PMAX. That is, when the window 2 is positioned within the pinch monitoring zone L, the pinch zone detection means 34 issues a first detection signal S1. The pinch monitoring zone L is the zone which may induce undesired pinching of an object blocking the path of motion of the window 2.

A stop time detection means 35 including a timer T1 (also see FIG. 4g) is operable such that when the UP-switch of the switch device 24 is turned OFF, the timer T1 starts and, until the OFF condition of the UP-switch is kept for a first stabilizing period t1, the timer T1 issues a second detection signal S2 (FIG. 2). An open time detection means 36 including a timer T2 (FIG. 4f) operates such that, when the UP-switch of the switch device 24 is turned OFF, the timer T2 starts to count time, and then when a second stabilizing period t2 passes, the timer T2 issues a third detection signal S3 (see FIG. 2).

In the pinch prevention portion A, denoted by numeral 37 is a speed detection means (periodic calculation portion) which, by calculating the period of the pulse signal outputted from the speed sensor 23, detects the closing speed (rising speed) of the window 2. Based on both the rising speed (closing speed) of the window 2 detected by the calculation portion 37 and the position counted by the position counter 33, a judgement is carried out as to whether or not an obstruction, such as a part of a passenger's body, is pinched by the rising window 2. According to the present embodiment, various methods may be utilized including methods 1), 2) and 3) as described hereinabove in relation to the first embodiment.

As is described hereinabove, a pinch detection means 38 issues the detection signal So when detecting a pinch. The motor control means 31 stops the motor 22 when receiving the detection signal So.

Hereinbelow, operation of the drive control device according to the second embodiment will be described in detail with reference to see FIGS. 8 and 9.

Figure 9A:
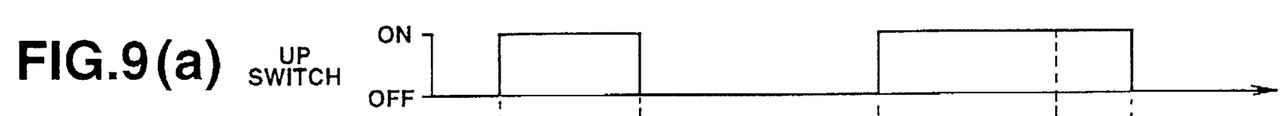
Figures 9B, 9C:
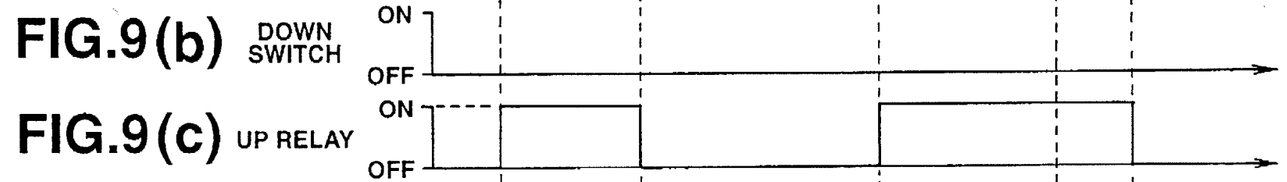
Figure 9D:
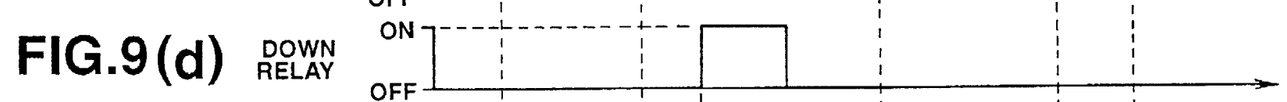
Figure 9E:
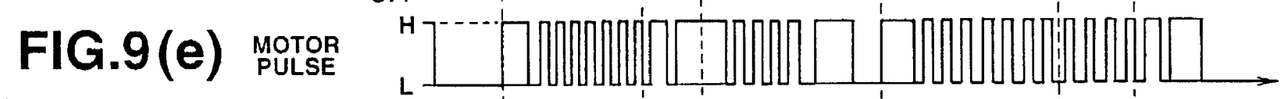
Figure 9F:
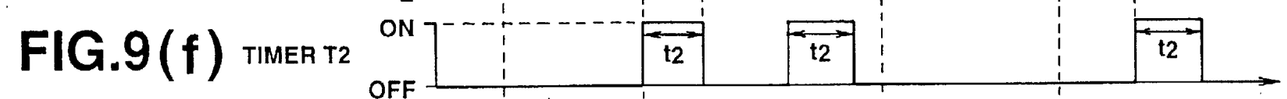
Figure 9G:
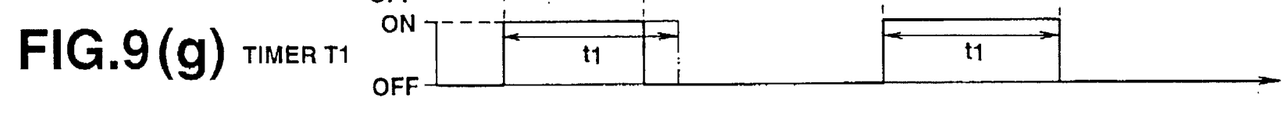

When, due to the DOWN-switch portion of the switching device 24 being turned ON a DOWN-signal is issued, the operation process goes to step S3 through process steps S1 and S2 and the motor control means 31 lowers the window 2 according to reverse control of the motor 22. However, when the UP-switch becomes ON (FIG. 9(a)) an UP-signal is issued and the timer T1 of the stop time detection means 35 is started at a step S4 and the UP-relay of the motor control means 31 is turned ON, so that rising movement of the window 2 is started at a step S5. When the mask time t0 has elapsed at step S6 and the window 2 is positioned within the pinch monitoring zone L (step S7), the pinch detection means 38 carries out pinch detection operation, as described above, at step S11.

If the window 2 is not positioned within the pinch monitoring zone L, rising movement of the window 2 is stopped at step S10 if termination of the UP signal is detected. That is, by turning the UP-relay OFF continuation of the UP signal (step S8) is terminated. Also, if the window reaches an uppermost position P0 (step S9), termination of the UP signal will result. Since, as set out in the description of the first embodiment, the mask time t0 is set longer than the time required for raising the window 2 from the lowermost position PMAX to the position Pn, the operation of step S8 is executed only when the window 2 is rising from the position P1 to the uppermost position P0.

The pinch detection operation of step S11 is continued and the UP-signal continues to be output at step S12 while the window 2 is within the pinch monitoring zone. When, during the pinch detection operation, a pinch is detected, the detection signal S0 is issued as has been described hereinafore and thus the motor 22 is stopped.

When, during pinch detection operation, the UP-switch (see FIG. 9a) is turned OFF to stop issuance of the UP-signal, it is determined whether or not the first stabilizing period t1 counted by the timer T1 has elapsed nor not (step S13). Then, when the first stabilizing period t1 has passed after stopping of the rising movement of the window 2, the UP relay is turned OFF at step S10. The first stabilizing period t1 is set somewhat longer than the mask time t0. That is, the time t1 is so determined as to minimize mechanical deterioration of the driving mechanism 20 which may occur due to repeated stopping of the window 2. That is, as will be described in detail hereinafter, operation wherein the window is slightly lowered to carry out pinch prevention operation after stopping of rising movement of the window 2, may be repeated frequently each time the rising movement of the window 2 is stopped (FIG. 9). Thus the first stabilizing period t1 is so determined as to minimize mechanical deterioration and assure smooth pinch prevention operation.

When however, the first stabiizing period counted by the timer T1 is not elapsed, that is, when the second detection signal S2 is still being output, the following pinch prevention operation will take place after stopping the rising movement of the window by turning OFF of the UP-relay at step S14.

First, the timer T2 of the opening time detection means 36 is started and then upon time-up of the timer T2, that is, upon expiration of the second stabilizing period t2 at step S16, the DOWN-relay is turned ON to cause downward movement of the window 2 at step S17. The length of the second stabilizing period t2 corresponds to a time elapsed from when an UP signal for commanding rising movement of the window 2 is terminated to when mechanical overrun is exhausted and the window 2 is completely stopped. Accordingly, downward movement of the window 2 is started only after the window 2 is completely stopped so that load applied to wire 21 of the driving mechanism 20 is reduced.

When the window 2 has been lowered by a predetermined pinch prevention degree at step S18, the DOWN-relay is turned OFF to stop downward movement of the window 2 at step S19. In this case, the degree by which the window 2 has been lowered is detected from the count value of the position counter 33. The predetermined pinch prevention degree is set to correspond to the degree by which the window 2 is moved in the second stabilizing period t2.

That is, when the rising movement of the window 2 is stopped, the window 2 is lowered by a predetermined pinch prevention degree subject to the conditions that (I) the window 2 is positioned within the pinch monitoring zone L and, (II) the first stabilizing period t1 has passed.

Accordingly, undesired results due to overrun of the window 2 can be avoided.

If desired, the condition (II) wherein passing of the first stabilizing period t1 is questioned may be omitted. That is, in this case, when the rising movement of the window 2 is stopped, lowering of the window 2 by the predetermined pinch prevention degree is made subject to only the condition (I). Furthermore, the pinch prevention portion A may be removed.

As with the above-described first embodiment, the graphs of FIGS. 5, 6(a) and 6(b) are applicable to the operation of the drive control device of the second embodiment.

To refer again to FIG. 5 the graph shows a relation between the closing position of the window 2 during window UP operation and the closing speed thereof. FIGS. 6(a) and 6(b) respectively show the closing speed of the window 2 and the closing load thereof during pinch prevention operation. The advantages and features according to the invention described in connection with these Figures in the above first embodiment are also available in the drive control device according to the second embodiment.

That is, according to operation according to the second embodiment, the operator may easily note that pinching has occurred and window positioning is established such that the obstruction which caused the pinching may be be easily removed.

Figure 6:
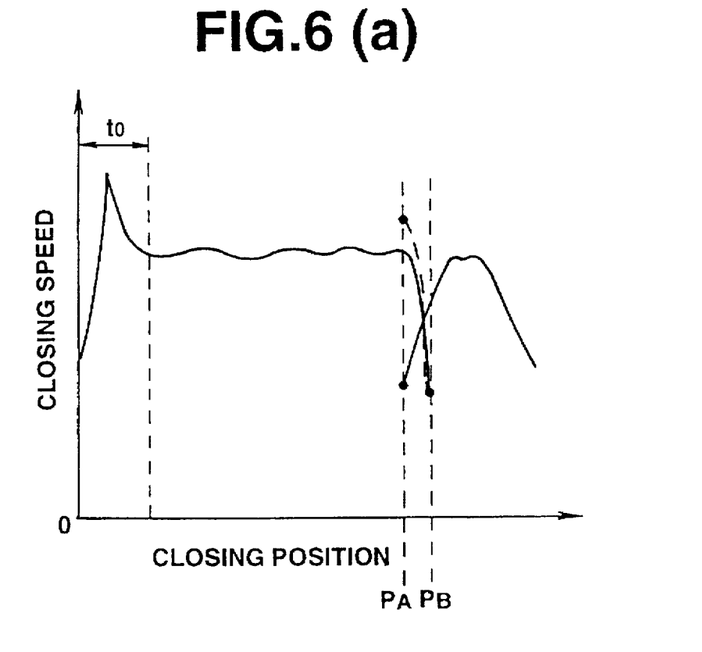
FIG. 6(a) and FIG. 6(b) are operational characteristic graphs showing an example of pinch prevention control executed by the drive control device of FIG. 1.

Also, as shown in FIGS. 6 if an obstruction being pinched is not removed from the path of window travel, increased load is instantly detected after the mask time and pinch prevention operation is carried out immediately. Thus the window may still be reliably stopped before strong pinching may be applied to the obstructing member.

In contrast to the above, as described in connection with FIGS. 7(a), 7(b), the conventional system does not compensate for overrun by returning to a pinch detection position. Further, if the pinched object is not removed and an operator should activate the switch for resuming window UP operation by the time the mask time t0 has elapsed, the conventional window has reached a second closing positon PC' which is substantially higher (i.e. lower counter value of P) than the second closing position PC of the invention and extreme pinching may result.

Thus, pinch prevention operation according to the second preferred embodiment of the invention, as has been described in detail hereinabove, also provides a highly safe drive control device which may reliably detect pinching due to the presence of an obstructing member in the path of motion of an opening/closing member while excessively strong pinching force is not applied to the obstructing member due to oversight or misoperation related to control of the opening/closing member.

It will be noted that, although the preferred embodiments of the invention have been set forth in terms of an automotive power window system, the present invention may also be utilized in various other mechanisms in which highly safe operation is desired for control of opening/closing members. Specifically, such control may be applied to valves, shutters, automatic door systems, access hatches and various other manually controlled opening/closing members for which operational safety must be assured in a case where an obstruction is encountered in the path of closing motion of the opening/closing member.

In addition, the above pinch prevention system is not limited to detection of pinching in the closing direction only, that is, pinch detection while an opening/closing member is moving in the opening direction may be effected. Such utilization is useful, for example, is a foreign object becomes wedged between an opening/closing member and a mounting frame thereof (i.e. vehicle window and doorframe) while the opening/closing member moves in the opening direction.

As has been described hereinabove, in the drive control device of the opening/closing member according to the present invention, when the closing movement of an opening/closing member such as a window is stopped, the opening/closing member is forced to move in an opening direction by a predetermined degree subject to the opening/closing member being positioned within a monitoring zone. Accordingly, undesired results caused cause by overrun of the opening/closing member, which takes place after terminating a control signal for stopping the closing movement of the opening/closing member, can be avoided, and a high degree of safety can be assured.

Figure 8:
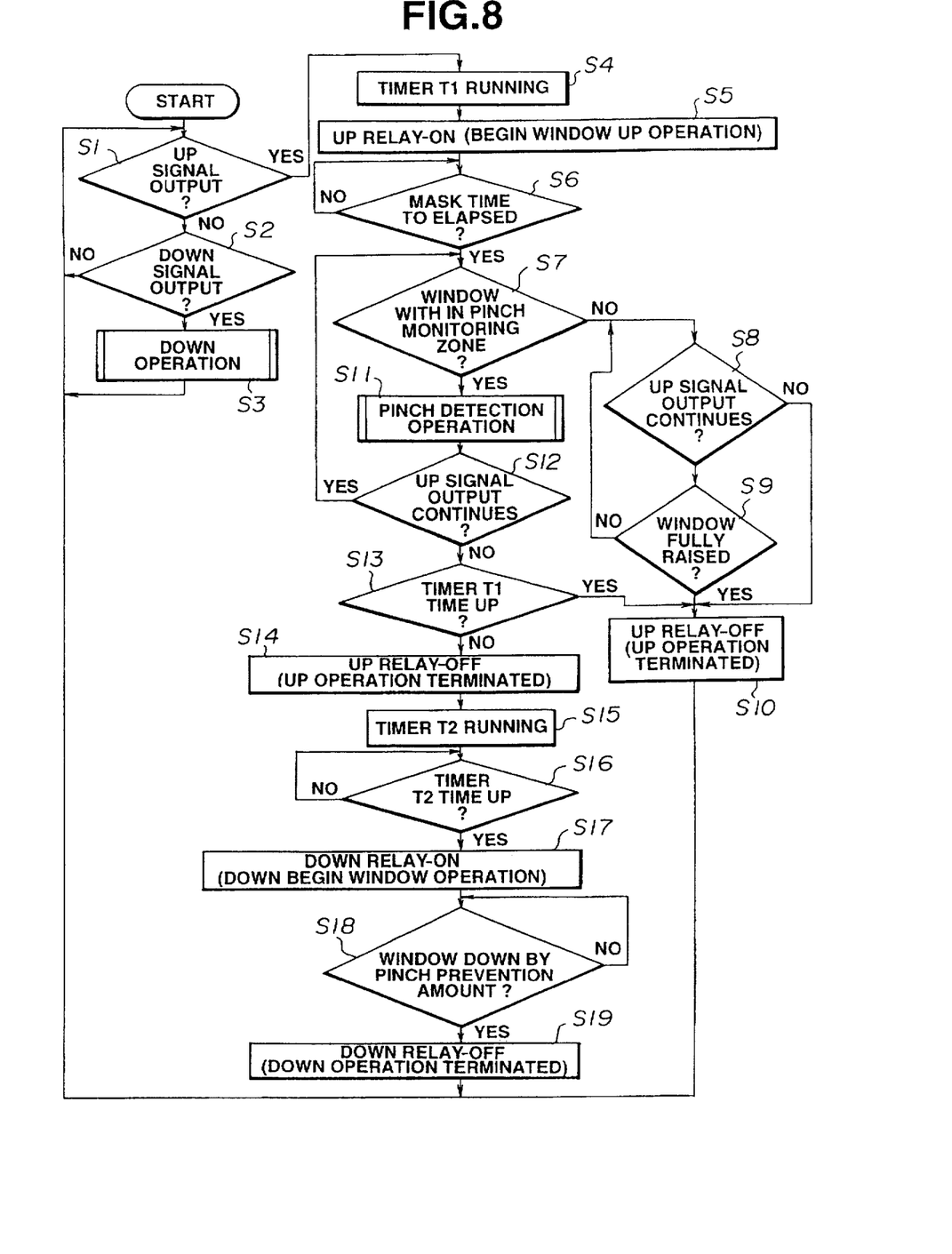
FIG. 8 is a flowchart depicting a control process according to a alternative embodient of the drive control device of the invention.

It will be noted that the detection method of the invention may be implemented in various ways and is not limited to the flowcharts of FIGS. 3 and 8. Further the features of the methods of the FIGS. 3 and 8 may be combined such that additional safety may be assured, for example, for controlling a vehicle window so as to move downward by the predetermined pinch prevention degree at both the initiation time and the termination time of window UP operation while the window is in the pinch monitioring zone. Further, the means for counting the time t2 for preventing current overload of the motor and associated wiring as taught in the second embodiment, may also be preferrably implemented in the above-described first embodiment.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A device for controlling movement of a window, comprising:

a motor adapted to move the window in opening and closing directions in response to a control signal;

an up switch shiftable between one position and an opposite position;

a down switch;

a control device adapted to develop the control signal in response to a state of an up relay connected to the up switch and a state of a down relay connected to the down switch, said control device being operative to develop the control signal in response to determination that the window is positioned within a pinch monitoring zone; and a timer triggered to start counting time in response to one shift of the up switch from the one position to the opposite position thereof, said timer being urged to cease counting time in response to another shift of the up switch from the opposite position to the one position thereof if the time counted does not reach a predetermined period of time although the timer ceases counting time upon expiration of the predetermined period of time, said control device closing the down relay temporarily regardless of position of the down switch in response to the another shift of the up switch under conditions where the timer has ceased counting time prior to expiration of the predetermined period of time and the window is positioned within the pinch monitoring zone.

2. A device as claimed in claim 1, wherein said one position of the up switch is an on position at which the window is moved in the closing direction, and said opposite position of the up switch is an off position at which the window is stopped from moving in the closing direction.

3. A device as claimed in claim 1, wherein said one position of the up switch is an off position at which the window is stopped from moving in the closing direction, and said opposite position of the up switch is an on position at which the window is moved in the closing direction.

4. A device as claimed in claim 3, further comprising a second timer triggered to start counting time in response to the another shift of the up switch, said second timer ceasing counting time upon expiration of a second predetermined period of time.

5. A device as claimed in claim 4, wherein said control device closes the down relay temporarily regardless of position of the down switch in response to the another shift of the up switch under conditions where the second timer has ceased counting time upon expiration of the second predetermined period of time, the timer has ceased counting time prior to expiration of the predetermined period of time, and the window is positioned within the pinch monitoring zone.

* * * * *